(12) United States Patent
Glaesser et al.

(10) Patent No.: US 8,156,922 B2
(45) Date of Patent: Apr. 17, 2012

(54) ELECTRICAL ACTUATING ARRANGEMENT FOR AN INTERNAL COMBUSTION ENGINE

(75) Inventors: Michael Glaesser, Berlin (DE); Isao Fukumoto, Berlin (DE); Ralf Neise, Berlin (DE); Peter Nitsch, Berlin (DE)

(73) Assignee: Pierburg GmbH, Neuss (DE)

( * ) Notice: Subject to any disclaimer, the term of this patent is extended or adjusted under 35 U.S.C. 154(b) by 81 days.

(21) Appl. No.: 12/674,530

(22) PCT Filed: Jun. 16, 2008

(86) PCT No.: PCT/EP2008/057534
§ 371 (c)(1),
(2), (4) Date: Jun. 18, 2010

(87) PCT Pub. No.: WO2009/024369
PCT Pub. Date: Feb. 26, 2009

(65) Prior Publication Data
US 2010/0326397 A1    Dec. 30, 2010

(30) Foreign Application Priority Data
Aug. 22, 2007   (DE) .......................... 10 2007 039 689

(51) Int. Cl.
*F02D 11/10*    (2006.01)
*F02D 11/00*    (2006.01)
(52) U.S. Cl. ..................................................... 123/399
(58) Field of Classification Search .................. 123/399, 123/400, 461, 198 R; 251/305, 129.11
See application file for complete search history.

(56) References Cited

U.S. PATENT DOCUMENTS

| 5,731,646 | A  | * | 3/1998 | Heinze et al. ................... 310/89 |
| 5,979,405 | A  |   | 11/1999 | Sato et al. |
| 6,557,523 | B1 | * | 5/2003 | Bos et al. ...................... 123/337 |
| 6,860,466 | B2 | * | 3/2005 | Sakurai et al. ........... 251/129.11 |
| 2001/0015195 | A1 |   | 8/2001 | Torii et al. |
| 2003/0024119 | A1 |   | 2/2003 | Kaiser et al. |

FOREIGN PATENT DOCUMENTS

| DE | 102004053703 A1 | 5/2006 |
| EP | 1126147 A2 | 8/2001 |
| EP | 1281849 A2 | 2/2003 |
| GB | 2323128 A | 9/1998 |

OTHER PUBLICATIONS

International Search Report mailed Nov. 21, 2008 which issued during the prosecution of corresponding International Patent Application No. PCT/EP2008/057534; 6 pages.

* cited by examiner

*Primary Examiner* — Mahmoud Gimie
(74) *Attorney, Agent, or Firm* — Norman B. Thot

(57) ABSTRACT

An electrical actuating arrangement for an internal combustion engine includes an electric drive motor disposed in a housing body. The electric drive motor includes a motor housing with a drive side closed by a plastic front plate. A mounting flange is disposed on a drive side of the electric drive motor, the mounting flange being integral with the motor housing. The plastic front plate extends at least partially radially beyond the motor housing and is configured to seat via a clamping fit in a corresponding recess of the housing body so as to radially fix the electric drive motor.

11 Claims, 1 Drawing Sheet

ELECTRICAL ACTUATING ARRANGEMENT FOR AN INTERNAL COMBUSTION ENGINE

CROSS REFERENCE TO PRIOR APPLICATIONS

This application is a U.S. National Phase application under 35 U.S.C. §371 of International Application No. PCT/EP2008/057534, filed on Jun. 16, 2008 and which claims benefit to German Patent Application No. 10 2007 039 689.0, filed on Aug. 22, 2007. The International Application was published in German on Feb. 26, 2009 as WO 2009/024369 A1 under PCT Article 21(2).

FIELD

The present invention relates to an electrical actuating arrangement for an internal combustion engine, the actuating arrangement comprising a housing body supporting an electric drive motor.

BACKGROUND

DE 10 2004 053 703 A1 describes an electrical actuating arrangement for an internal combustion engine. Such actuating arrangements, when used in connection with an internal combustion engine, serve to adjustment actuating organs such as, for example, throttle flaps, tumble, swirl or switching flaps.

The drive motor comprises a metallic motor housing having its drive side closed by a separate plastic front plate. By means of separate bracket-like elements made of plastic or metal, the drive motor is screwed to the housing body and thus axially clamped into place. In this manner, there is at the same time realized a radial positioning of the drive motor on the drive side within the housing body. The closed opposite side of the housing body is radially fixed by a cylinder-cup-shaped projection of the motor housing that is seated with little clearance in a corresponding recess of the housing body.

SUMMARY

An aspect of the present invention is to provide an actuating arrangement with enhanced production and assembly thereof.

In an embodiment, the present invention provides an electrical actuating arrangement for an internal combustion engine which includes an electric drive motor disposed in a housing body. The electric drive motor includes a motor housing with a drive side closed by a plastic front plate. A mounting flange is disposed on a drive side of the electric drive motor, the mounting flange being integral with the motor housing. The plastic front plate extends at least partially radially beyond the motor housing and is configured to seat via a clamping fit in a corresponding recess of the housing body so as to radially fix the electric drive motor.

BRIEF DESCRIPTION OF THE DRAWINGS

The present invention is described in greater detail below on the basis of embodiments and of the drawings in which.

DETAILED DESCRIPTION

Figure 1:
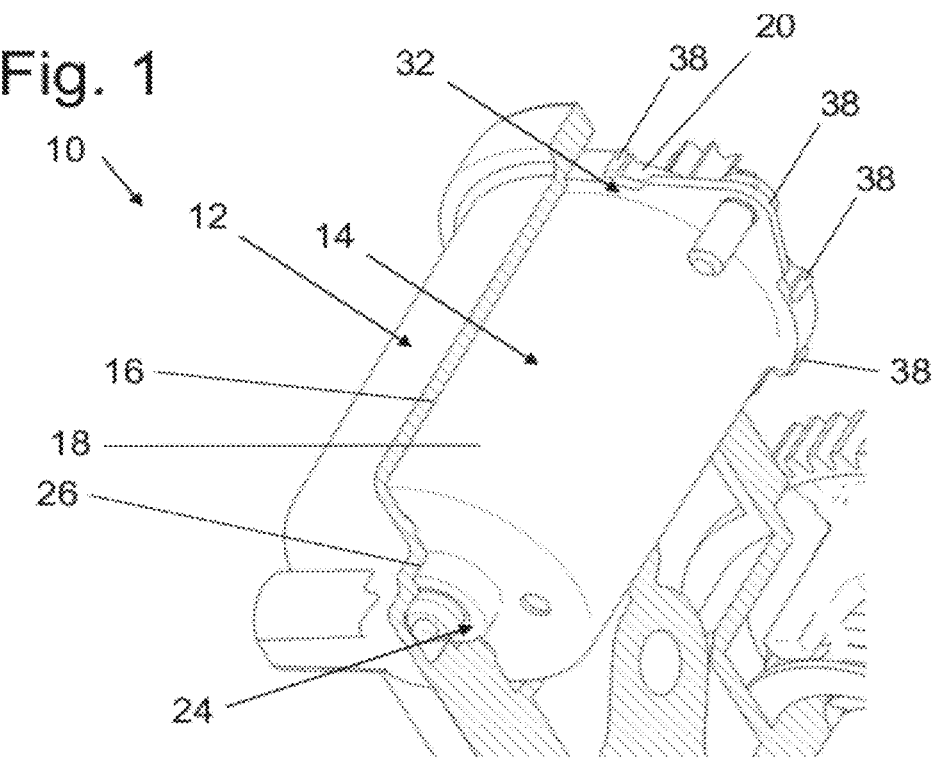
FIG. 1 shows an opened actuating arrangement, with the housing body represented in longitudinal sectional view and the drive motor in its inserted state.

The actuating arrangement of the present invention comprises, on the drive side, a mounting flange which is formed integrally with the motor housing. Further, said front plate at least partially extends laterally, for example, radially, beyond the housing and is seated, by way of clamping fit, in a corresponding recess of the housing body. The axial fixation of the drive motor in the housing body is thus effected by a mounting flange which is not a separate component, but is integrally molded to the motor housing or is designed to form one unit with the motor housing. The motor housing and the mounting flange consist, for example, of a substantially cylindrical sheet-metal body.

At least in places, the plastic front plate extends laterally beyond the substantially cylindrical motor housing. The housing body comprises a corresponding cylinder-cup-shaped recess for accommodating the drive motor. The outermost outer diameter of the front plate and respectively of the components which extend laterally beyond the motor housing, is slightly larger than the inner diameter of the corresponding recess of the housing body, so that the drive motor is radially fixed by a slight clamping effect. Fixation of the drive motor within the housing body should not require further component parts except for screws. As a result, the production of the actuating arrangement components, the housing and the drive motor as well as the mounting process are considerably facilitated.

The mounting is performed in that the drive motor is inserted, by its motor housing, into the corresponding recess of the housing body so that the front plate will also be introduced into the recess with clamping fit. The mounting flange of the drive motor will finally abut against the corresponding flange faces of the housing body and, thereon, are axially fixed to the housing body with the aid of screw elements or the like. In this manner, there is obtained a firm and defined seat of the drive motor in the housing body. The thus effected fixation of the drive motor within the housing body is durably firm and will improve the vibration resistance of the actuating arrangement. By the reduction of the number of components, the number of possible disturbing factors is also reduced and the tolerance situation within the overall mechanical system is improved.

The front plate comprises, for example, at least three radial clamping ribs laterally extending beyond the cylindrical motor housing and clampingly seated in the recess of the housing body. The provision of three or more radial clamping ribs makes it possible to realize a defined seat of the drive motor in the recess of the housing body. The base body of the front plate can—but does not need to—have a smaller outer diameter than the motor housing.

The front plate carries, for example, a rotor pivot bearing and/or a brush rocker. The number of components is thereby reduced, with a resultant reduction of the production and assembly costs as well.

An embodiment of the present invention will be explained in greater detail hereunder with reference to the drawings.

Figure 2:
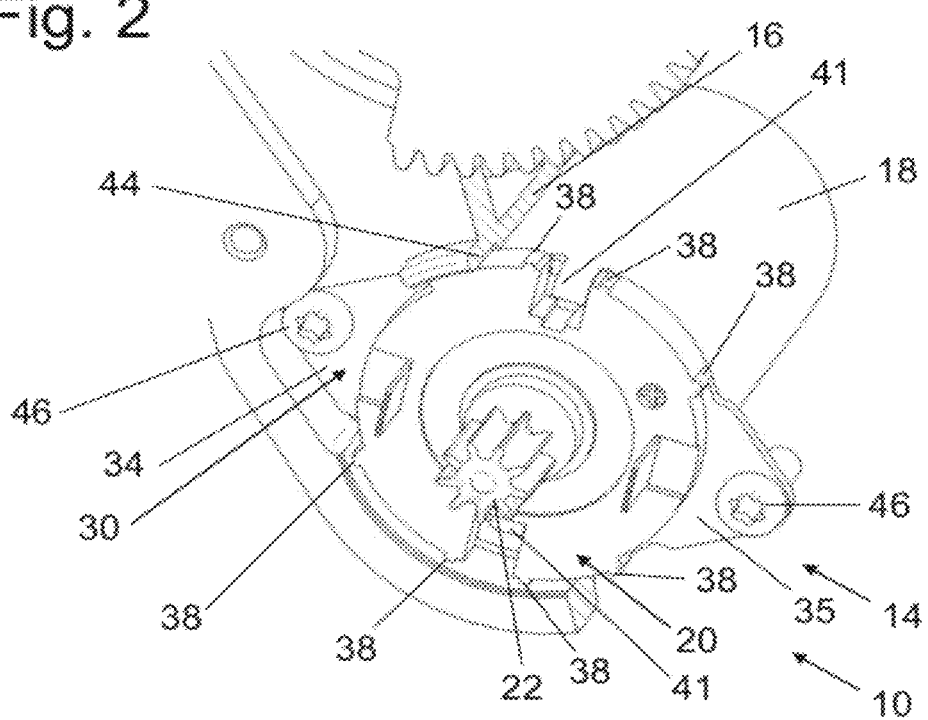
FIG. 2 shows the actuating arrangement of FIG. 1 in a perspective view towards the front plates of the drive motor.

Illustrated in FIGS. 1 and 2 is an electrical actuating arrangement 10 for internal combustion engines. Said actuating arrangement comprises a housing body 12, an electric drive motor 14 as well as further components. In the views shown in FIGS. 1 and 2, a plastic cover for the housing, serving to close the open side of the plastic housing body 12 that is shown in FIG. 2, has been omitted for easier survey.

Housing body 12 comprises a substantially cylindrical recess 16 accommodating the drive motor 14. Drive motor 14 comprises, among other things, a substantially cylindrical metallic motor housing 18 which on its drive side shown in FIG. 2 is closed by a separate plastic front plate 20. On said drive side, the rotor shaft emerges from motor housing 18 with a motor pinion 22.

The cylindrical portion of motor housing 18 is arranged with a clearance of, for example, 1 mm, in said housing body recess 16. On the closed side of drive motor 14 shown in FIG. 1, motor housing 18 comprises a cup-shaped projection 24 seated with little clearance in a corresponding projection recess 26 of housing body 12.

The drive side of drive motor 14 is fixed internally of housing body 12 in the following manner:

Motor housing 18 comprises a mounting flange 30 designed to form one unit therewith, said mounting flange being formed by a surrounding flange collar 32 and two flange tongues 34,35 oriented at an angle of about 180 degrees relative to each other. Motor housing 18 and mounting flange 30 are integrally formed of sheet metal having a thickness of about 1 mm. Seated on the opening of motor housing 18 is a plastic front plate 20 which is fixed with the aid of two bending lugs 41 of motor housing 18. On its inner side, front plate 20 carries a rotor pivot bearing and a brush rocker. Front plate 20 is substantially formed as an annular disk and, externally of said flange tongues 34,35, terminates flush with said fastening flange 32. Front plate 20 comprises eight radial clamping ribs 38 extending radially, for example, laterally, towards the outside and beyond the cylindrical motor housing 18 by about 1 mm.

Drive motor 14 is to be mounted in housing body 12 by axially inserting drive motor 14 into said housing body recess 16. During this process, said projection 24 on the drive motor side, provided to accommodate a further rotor pivot bearing, will take a position in the recess 26 on the housing body side. Front plate 20 will, by its clamping ribs 38, further be clamped within a circular projection 44 on the opening side of recess 16. Flange tongues 34,35 will be screwed to corresponding flange surfaces of housing body 12 with the aid of fastening screws 46.

On its drive side, drive motor 14 will be radially fixed by front plate 20 and axially fixed by screwing the mounting flange 30 and respectively the flange tongues 34,35 to housing body 12. In this manner, a reliable and clearance-free mounting and fixation of drive motor 14 within housing body 12 is realized by use of only few component parts.

The present invention is not limited to embodiments described herein; reference should be had to the appended claims.

The invention claimed is:

1. An electrical actuating arrangement for an internal combustion engine, the electrical actuating arrangement comprising an electric drive motor disposed in a housing body, the electric drive motor including a motor housing with a drive side closed by a plastic front plate, a mounting flange being disposed on a drive side of the electric drive motor, the mounting flange being integral with the motor housing, wherein the plastic front plate extends at least partially radially beyond the motor housing and the plastic front plate is itself configured to seat via a clamping fit in a corresponding recess of the housing body so as to radially fix the electric drive motor.

2. The electrical actuating arrangement as recited in claim 1, wherein the motor housing and the mounting flange include a sheet-metal body.

3. The electrical actuating arrangement as recited in claim 1, wherein the plastic front plate includes at least three radial clamping ribs.

4. The electrical actuating arrangement as recited in claim 1, wherein the plastic front plate is configured to receive a rotor pivot bearing.

5. The electrical actuating arrangement as recited in claim 1, wherein the plastic front plate is configured to receive a brush rocker.

6. The electrical actuating arrangement as recited in claim 1, wherein the electric drive motor further includes, on the side opposite the drive side, a cup-shaped projection disposed in a corresponding recess of the housing body.

7. An electrical actuating arrangement for an internal combustion engine, the electrical actuating arrangement comprising an electric drive motor disposed in a housing body, the electric drive motor including a motor housing with a drive side closed by a plastic front plate, a mounting flange being disposed on a drive side of the electric drive motor, the mounting flange being integral with the motor housing, wherein the plastic front plate extends at least partially radially beyond the motor housing and is configured to receive a rotor pivot bearing, the plastic front plate itself being configured to seat via a clamping fit directly in and to a corresponding recess of the housing body so as to radially fix the electric drive motor.

8. The electrical actuating arrangement as recited in claim 7, wherein the motor housing and the mounting flange include a sheet-metal body.

9. The electrical actuating arrangement as recited in claim 7, wherein the plastic front plate includes at least three radial clamping ribs.

10. The electrical actuating arrangement as recited in claim 7, wherein the plastic front plate is configured to receive a brush rocker.

11. The electrical actuating arrangement as recited in claim 7, wherein the electric drive motor further includes, on the side opposite the drive side, a cup-shaped projection disposed in a corresponding recess of the housing body.

\* \* \* \* \*